United States Patent
Liu et al.

(10) Patent No.: US 6,561,701 B1
(45) Date of Patent: May 13, 2003

(54) PACKAGING AND SEALING OF MULTI-PORT FIBER OPTIC DEVICE

(75) Inventors: Yuqiao Liu, Sunnyvale, CA (US); Peter C. Chang, Mountain View, CA (US)

(73) Assignee: Alliance Fiber Optics Products, Inc., Sunnyvale, CA (US)

( * ) Notice: Subject to any disclaimer, the term of this patent is extended or adjusted under 35 U.S.C. 154(b) by 0 days.

(21) Appl. No.: 09/637,477

(22) Filed: Aug. 11, 2000

(51) Int. Cl.⁷ .............................................. G02B 6/255
(52) U.S. Cl. ............................ 385/99; 385/31; 385/33; 385/34; 359/124; 359/131
(58) Field of Search ............................ 385/24, 31, 33, 385/34, 65, 99; 359/124, 131

(56) References Cited

U.S. PATENT DOCUMENTS

| | | | | |
|---|---|---|---|---|
| 5,463,711 A | * | 10/1995 | Chu ............................ | 385/101 |
| 5,602,952 A | * | 2/1997 | Rashleigh et al. ........... | 385/100 |
| 5,796,889 A | * | 8/1998 | Xu et al. ....................... | 385/24 |
| 5,809,193 A | * | 9/1998 | Takahashi ..................... | 385/79 |
| 5,845,023 A | * | 12/1998 | Lee ............................... | 385/33 |
| 6,019,522 A | * | 2/2000 | Kim .............................. | 385/80 |
| 6,023,542 A | * | 2/2000 | Pan et al. ....................... | 385/24 |
| 6,118,910 A | * | 9/2000 | Chang ........................... | 385/16 |
| 6,246,812 B1 | * | 6/2001 | Liu et al. ....................... | 385/34 |
| 6,272,264 B1 | * | 8/2001 | Li et al. ......................... | 385/27 |

* cited by examiner

*Primary Examiner*—Akm E. Ullah
*Assistant Examiner*—Jennifer Doan

(57) ABSTRACT

A fiber optic assembly includes a multi-port fiber optic device (100) with a buffer (200) circumferentially mounted thereon. A metallic foil (300) with the sealant (400) coated thereon, wraps around the buffered multi-port fiber optic device, and is crimped at two opposite longitudinal ends thereof. Both the buffer (200) and the sealant (400) are cured for reinforcement of the whole package assembly.

15 Claims, 2 Drawing Sheets

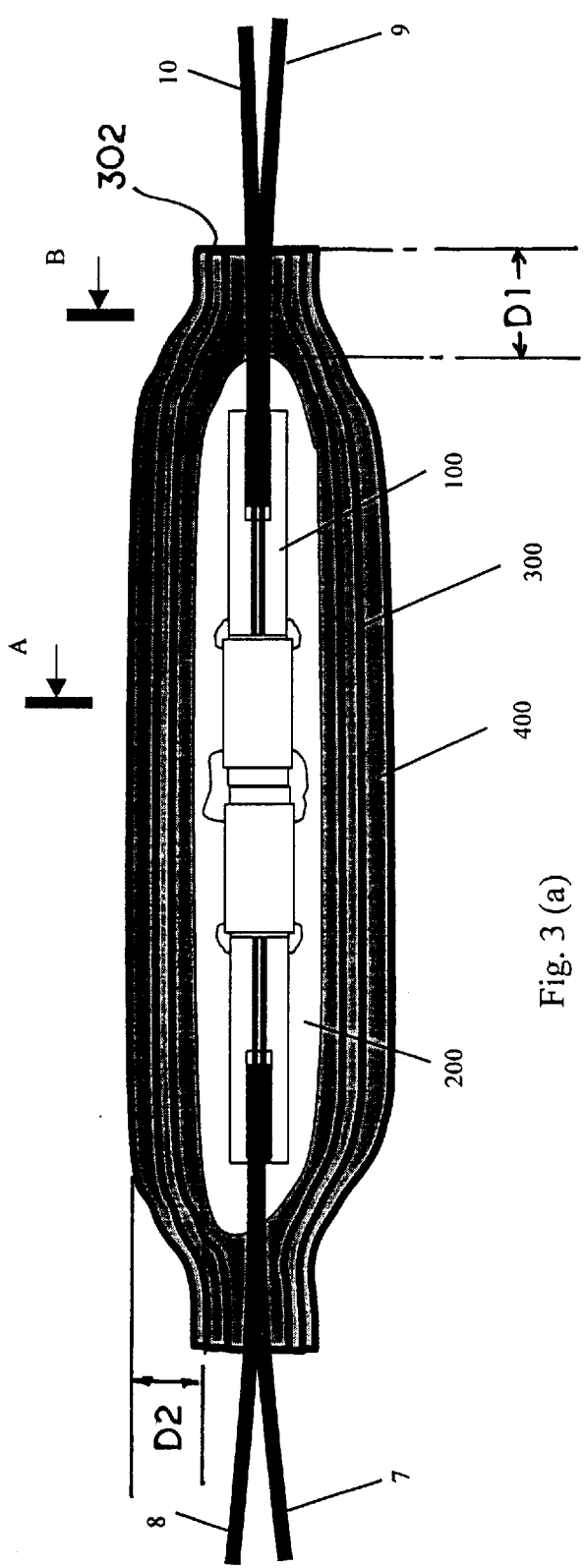
Fig. 3 (a)
Fig. 3 (b)
Fig. 3 (c)

PACKAGING AND SEALING OF MULTI-PORT FIBER OPTIC DEVICE

BACKGROUND OF THE INVENTION

1. Field of The Invention

The invention relates to the packaging and sealing of a multi-port fiber optic device, and particularly to those of an optical DWDM (Dense-Wavelength-Division-Multiplexing) multiplexer or demultiplexer.

2. The Related Art

The multi-port fiber optic device as disclosed in the copending patent application Ser. No. 09/577,200 filed May 23, 2000, is very vulnerable to the environmental stress and the handling situation. In order to maintain stable performance under the harsh environmental conditions and over the long-term applications, proper sealing of the whole device is relatively very important. The prior art in sealing such a device normally uses a sleeve with the device threaded therein and is sealed with caps shielding both ends of the sleeve. The corresponding optical fibers are threaded through the center of the cap and protected by the flexible rubbery boots circumferentially around the end of the sleeve.

The main disadvantage of the prior art is that it has difficulties to thread the device into the sleeve, fix the device with regard to the sleeve, and further more evenly apply the sealing material/mechanism on the device. Additionally, threading of the fibers complicates the procedure and applying of the sealing material may contaminate the whole package which may severely impair the packaging quality. In brief, relatively more components and procedures complicates and costs the whole assembly relatively too much.

An object of the invention is to provide a multiplexer/demultiplexer with an easy packaging and reliable sealing to protect the internal multi-port fiber optic device and the method making the same. The package is to protect the device from moisture, mechanical impact and other environmental stress.

SUMMARY OF THE INVENTION

According to an aspect of the invention, a fiber optic assembly comprises a multi-port fiber optic device pre-coated with flexible rubbery material which functions as buffer. The multi-port fiber optic device with the associated rubbery material then is rolled into and wrapped/packaged by a metallic foil with a sealing material coated thereon. The whole package including the metallic foil and the multi-port fiber optic device, has a roll configuration and is crimped at both ends. Lastly, the sealing material is cured/vulcanized to finish the full packaging. Therefore, the finalized fiber optic assembly owns a compact, robust structure, low cost in manufacturing, and high stability in a hazardous environment.

BRIEF DESCRIPTION OF THE DRAWINGS

FIG. 3(A) is a sectional view of the buffered multi-port fiber optic device rolled into and wrapped with a metallic foil painted with sealant thereon.

FIG. 3(B) is a cross-sectional view of the packaged multi-port fiber optic device along line A.

FIG. 3(C) is a cross-sectional view of the packaged multi-port fiber optic device along line B.

DETAILED DESCRIPTION OF THE PREFERRED EMBODIMENT

References will now be in detail to the preferred embodiments of the invention. While the present invention has been described in with references to the specific embodiments, the description is illustrative of the invention and is not to be construed as limiting the invention. Various modifications to the present invention can be made to the preferred embodiments by those skilled in the art without departing from the true spirit and scope of the invention as defined by appended claims.

Figure 1:
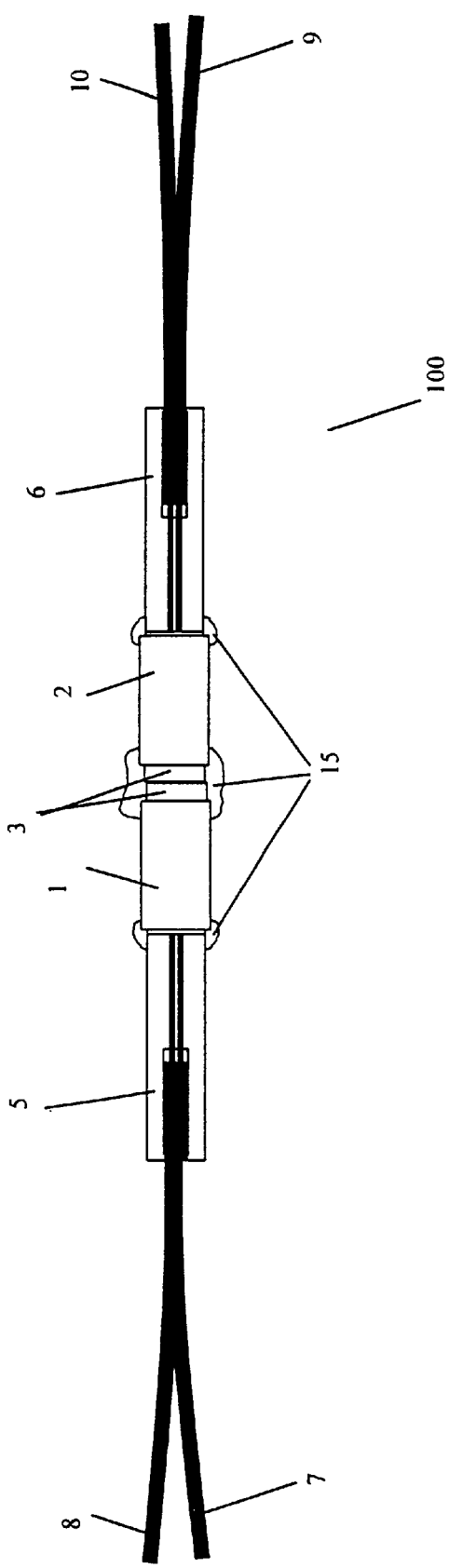
FIG. 1 is a sectional view of a multi-port fiber optic device according to the aforementioned copending application Ser. No. 09/577,200 filed May 23, 2000.
Figure 2:
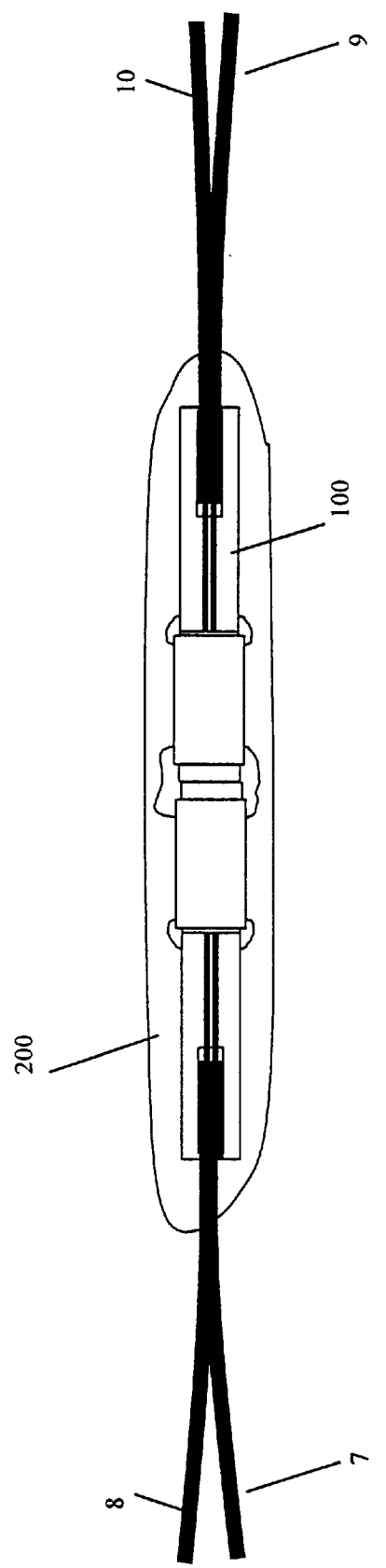
FIG. 2 is a sectional view of the multi-port fiber optic device of FIG. 1 coated with a rubbery buffer layer according to the invention.

It will be noted here that for a better understanding, most of like components are designated by like reference numbers therethrough the various figures in the embodiments. Attention is directed to FIGS. 1 wherein a multi-port fiber optic device 100 includes a first fiber ferrule 5, a first GRIN lens 1, a filter device 3, a second GRIN lens 2, and a second fiber ferrule 6 all successively adhered together with one another by adhesives 15. Two fiber pigtails 7, 8 extend from the first fiber ferrule 5, and two fiber pigtails 9, 10 extend from the second ferrule 6. The filter device 3 can be of a single piece, or two or more pieces cascaded and adhered together. The number of the fiber pigtails extending from each of the ferrule 5, 6 can be one, two or more.

The features of the invention are disclosed below. Referring to FIGS. 2 and 3(A)–3(C), the multi-port fiber optic device 100 is first coated with a layer of flexible rubbery material such as acrylic or silicone adhesives, to provide the device 100 with a buffer 200 for buffering the environmental mechanical stresses. This coating covers all the device 100 including a small portion of the extending pigtails, thus forming a smooth cylinder contour. The buffer 200 is then cured completely.

A metallic foil 300 is coated with a layer of sealant 400 such as silica-filled epoxy all over at least one side thereof. Then, the multi-port fiber optic device 100 with the buffer 200 thereon, i.e., the buffered multi-port fiber optic device, is rolled tightly into the sealant-painted foil with a plurality of turns, and successively, two ends of this roll-like buffered multi-port fiber optic device are crimped so as to make sure there is no air bubble or leakage in or through the rolled metallic foil 300, sealant 400 and the buffered multi-port fiber optic device 100. The sealant is then cured or hardened to finalize the total packaging and obtain the final whole assembly. The crimping at two opposite ends of the coated foil not only fixes the rolled foil 300 itself for preventing it from unwrapping, but also further secures in position the fibers 7, 8, 9, 10 extending therethrough and providing a moisture resistant sealing.

It can be understood that in this embodiment the distance D1 of the rolled foil 300 by two opposite ends of the buffered multi-port fiber optic device along the axial direction of the device 100, can be extended long enough to prevent the moisture from permeate through to the core of the whole package.

It is also noted the moisture also may permeate the inner multi-port fiber optic device 100 through the open slit 304, where the sealant 400 occupies, around the distal rolling tip 306 of the foil 300 which cooperates with the sealant layer to alternately surround the buffered device in a spiral manner. Nevertheless, such invading moisture needs to permeate along the sealant 400 and travel several rounds(circles) of the buffered device before it reaches the buffered device, depending on how may layers/rounds the rolling foil 300 applied on the buffered device, because the metallic foil 300 is moisture-proofed. Therefore, the total thickness D2 of the coated foil in the radial direction of the buffered device, may be kept much smaller than D1 while still performing the superior moisture-proof function, thus assuring the whole package is of a compact and robust structure.

In comparison with the prior art which uses the sleeve to secure and hold the inner multi-port fiber optic device therein, the invention provides a compact, robust fiber optic assembly with excellent moisture resistance and reliable mechanical buffer and support by a simple, economic method.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claim. For example, the two opposite longitudinal ends may be fastened/sealed/shielded by other physical or chemical way rather than the crimping applying thereon for securing the whole package and/or preventing moisture from permeating the inner core.

Therefore, person of ordinary skill in this field are to understand that all such equivalent structures are to be included within the scope of the following claims.

We claim:

1. A fiber optic assembly comprising:
   a multi-port fiber optic device;
   a buffer applied around said multi-port fiber optic device;
   a metallic foil wrapping around the buffer with a plurality of turns;
   wherein
      means is applied to two opposite longitudinal ends of the wrapped foil for either preventing moisture from invading the inner multi-port fiber optic device or securing the assembly, and the metallic foil is coated with a layer of sealant so that said layer of sealant and the metallic foil alternately surround the buffer.

2. The assembly as defined in claim 1, wherein said sealant is cured to increase strength of the assembly.

3. The assembly as defined in claim 1, wherein a pair of fibers extend through each of said two opposite longitudinal ends of the metallic foil.

4. The assembly as defined in claim 1, wherein each of said two opposite longitudinal ends is crimped.

5. The assembly as defined in claim 1, wherein a dimension of the foil by each of said two opposite longitudinal ends along an axial direction of the assembly is larger than a thickness of the foil along a radial direction of the assembly.

6. A method of making a fiber optic assembly, comprising steps of:
   providing a multi-port fiber optic device including at least a fiber ferrule, a GRIN lens and a filter device thereof;
   applying a buffer circumferentially around said multi-port fiber optic device;
   rolling a metallic foil directly and substantially fully circumferentially around the buffered multi-port fiber optic device with a plurality of turns; and
   applying means for either fastening or sealing the whole assembly around two opposite longitudinal ends of the foil, and further including a step of applying a layer of sealant on the foil before rolling the foil.

7. The method as defined in claim 6, further including a step of curing the sealant after rolling the foil.

8. The method as defined in claim 6, further including a step of curing the buffer before rolling the foil.

9. The method as defined in claim 6, wherein said means is to crimp the ends of the foil.

10. The method as defined in claim 9, wherein air bubble or leak is expelled from the rolled foil during crimping the ends of the foil.

11. The method as defined in claim 6, wherein a pair of fibers extend through the ends of the foil.

12. A fiber optic assembly comprising:
   a multi-port fiber optic device including at least a fiber ferrule, a GRIN lens and
   a filter device thereof;
   a buffer applied circumferentially around said multi-port fiber optic device;
   a metallic foil wrapping directly and substantially fully circumferentially around the buffer with a plurality of turns; wherein
      said metallic foil tightly surrounds the buffer and at least one layer of sealant is coated upon the metallic foil.

13. The assembly as defined in claim 12, wherein said metallic foil not only covers the buffer radially, but also extends beyond two opposite ends of the buffer with an axial distance to form shielding thereabouts.

14. The assembly as defined in claim 13, wherein means is applied to two opposite longitudinal ends of the wrapped foil for fastening the assembly.

15. The assembly as defined in claim 14, wherein fibers of the multi-port fiber optic device extending through said two opposite longitudinal ends of the wrapped foil, are secured in position by said means.

* * * * *